United States Patent [19]
Jablonsky

[11] 3,927,604
[45] Dec. 23, 1975

[54] POWER STEERING SYSTEM WITH REACTION FORCE LIMITING MEANS

[75] Inventor: Erich Jablonsky, Bobingen, Rems, Germany

[73] Assignee: Zahnradfabrik Friedrichshafen AG, Friedrichshafen, Germany

[22] Filed: May 7, 1973

[21] Appl. No.: 357,603

Related U.S. Application Data

[63] Continuation-in-part of Ser. No. 266,053, June 26, 1972, Pat. No. 3,855,904.

[30] Foreign Application Priority Data
May 6, 1972 Germany............................ 2222334

[52] U.S. Cl. ..................... 91/434; 91/371; 91/437; 91/441; 91/465; 92/60; 91/375 R
[51] Int. Cl............................................. F15b 13/14
[58] Field of Search ............. 91/434, 370, 371, 372, 91/373, 465, 437, 441, 374, 375 R, 375 A; 137/636, 636.1; 92/60

[56] References Cited
UNITED STATES PATENTS

| | | | |
|---|---|---|---|
| 2,685,342 | 8/1954 | Lauck............................ | 91/434 X |
| 2,930,357 | 3/1960 | Brveder............................ | 91/465 X |
| 2,934,089 | 4/1960 | Meyers............................ | 91/434 X |
| 3,180,233 | 4/1965 | Jablonsky............................ | 91/465 X |
| 3,408,900 | 11/1968 | Tamaki Tomita..................... | 91/372 |
| 3,469,890 | 9/1969 | Fulmer............................ | 91/434 X |
| 3,602,101 | 8/1971 | Jablonsky et al. .............. | 91/434 X |
| 3,630,233 | 12/1971 | Miyamoto......................... | 91/375 A |
| 3,657,967 | 4/1972 | Suzuki ............................ | 91/375 A |
| 3,692,137 | 9/1972 | Inoue............................... | 91/434 X |
| 3,772,962 | 11/1973 | Suzuki ............................ | 91/359 |
| 3,777,839 | 12/1973 | Uchiyama et al................. | 91/434 X |

*Primary Examiner*—Martin P. Schwadron
*Assistant Examiner*—Abraham Hershkovitz

[57] ABSTRACT

A fluid power steering system in which reaction pistons engage the steering spindle through which control valves are actuated to apply operating pressure to a double acting piston connected to the steering nut. Force limiting pistons connected to the reaction pistons contribute to the generation of reaction force yieldably resisting the steering effort applied to the control valves through the steering spindle. At a certain value of the operating pressure, the force exerted by the force limiting piston on its reaction piston is canceled to thereby limit the reaction force produced in accordance with power steering demands.

15 Claims, 2 Drawing Figures

POWER STEERING SYSTEM WITH REACTION FORCE LIMITING MEANS

This invention relates to an auxiliary power steering system of the type disclosed in my prior copending application, U.S. Ser. No. 266,053, filed June 26, 1972, now U.S. Pat. No. 3,855,904, with respect to which this application is a continuation-in-part.

A fluid power steering system of the pressure storage type is disclosed in the prior copending application aforementioned, the disclosure of which is incorporated herein by reference, and includes means for producing reaction force and limiting the reaction force similar in characteristics to that of the standard flow recirculating type of system. In order to limit the reaction force, springs are provided in a limiting valve. To meet certain steering requirements, the structure and size of the control valve has become too large, creating installational problems. It is therefore an object of this invention to enable one to avoid the foregoing disadvantage and to make more universal use of a reaction force limiting arrangement.

The invention resides in a control arrangement disposed in a threaded spindle and operable by way of two actuator pins on a steering spindle. A control valve and a hydraulic force limiting valve are simultaneously actuated, whereby the limiting valve having two pistons with pressure faces, are subjected to the pressure stored in a pressure line and the operating pressure in one of the pressure chambers shifting the steering nut.

Further characteristics of the invention reside in the dimensioning of pressure faces on the force limiting valves so that they may limit the reaction force by producing a counter-force that is about 30 to 50% of the maximum reaction force produced by the operating pressure exerted on the reaction piston. This operating pressure corresponds to the power required during travel of the vehicle whereas the power need during parking, as is well-known, is much higher.

Further, the hydraulic forces, acting upon the limiting valve piston, are dependent on the ratio of the pressure face areas as well as the ratio of the storage pressure to the operating pressure, so that every reaction valve piston is adjustable relative to the actuating pin without clearance, by means of an expansion bolt, while the limiting valve piston engages a stop in the average terminal or neutral position of the steering device.

Also, each reaction piston is positioned by a spring, whereby the actuator pins of the steering spindle are maintained in their neutral position.

The advantages achieved by the invention arises from the fact that a hydraulically produced counter-force limits the reaction force during parking, created mechanically heretofore by springs, so that auxiliary power steering with storage pressure operation may be more widely used.

One embodiment of the invention will be described in more detail with reference to the accompanying drawings, in which.

Figure 1:
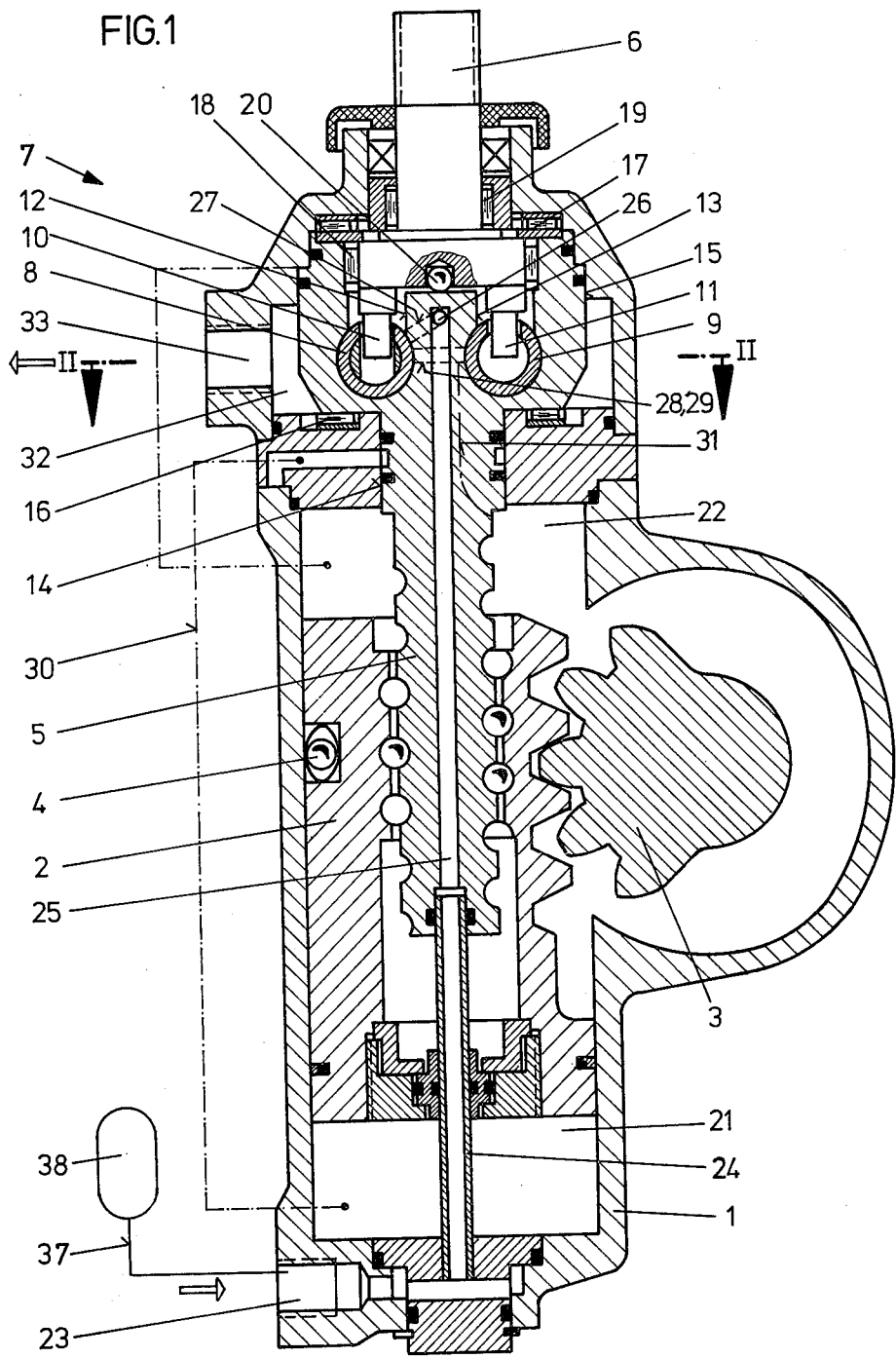
FIG. 1 is a longitudinal section view throug a servo steering gear with a control arrangement for storage operation.

In FIG. 1, a steering gear housing 1, constituting a servo cylinder, encloses a hydraulic, double acting piston (2) connected to a steering nut, which meshes externally with a sector gear formation on shaft 3. Through a row of balls 4, the nut 2 is internally engaged with a threaded spindle 5. The spindle 5 is operatively connected to a steering spindle 6 at an enlarged driving end within which a fluid pressure control assembly 7 is disposed. The control assembly includes a control valve 8 and a reaction force limiting device 9 extending transverse to the longitudinal axis of the housing and spindle 5. Two actuator pins 10 and 11, projecting from the inner end of the steering spindle 6, adjustably position the control valve 8 and the limiting device 9 at the beginning of the steering movement, in opposite axial directions before they engage the threaded spindle 5 by abutting surfaces 12 and 13. The threaded spindle 5 is rotatably mounted by radial antifriction bearings 14 and 15 while axial needle bearings 18 and 19 rotatably mount the steering spindle 6 in coaxial relation. Axial thrust applied to the spindles 5 and 6 are absorbed by needle bearings 16 and 17 while a centering bearing 20 is positioned axially between the spindles.

The hydraulic piston 2 separates the steering gear housing 1 into two pressure chambers 21 and 22. A supply of pressure medium is conducted to the control assembly 7 through inlet 23 in the steering gear housing 1, a pipe 24 extending coaxially through the hydraulic piston 2 into the threaded spindle 5, through an axial bore 25, a radial bore 26 and a further bore 27 in the threaded spindle 5. Two channels 28 and 29 establish fluid communication between the control valve 8 and the reaction limiting device 9. The channel 28 is connected by way of passage 30 with the pressure chamber 21 while the channel 29 is connected with the pressure chamber 22 by way of a passage 31 schematically shown by dotted lines in FIG. 1. An annular channel 32 with an outlet 33 conducts the pressure medium from the control valve 8.

Figure 2:
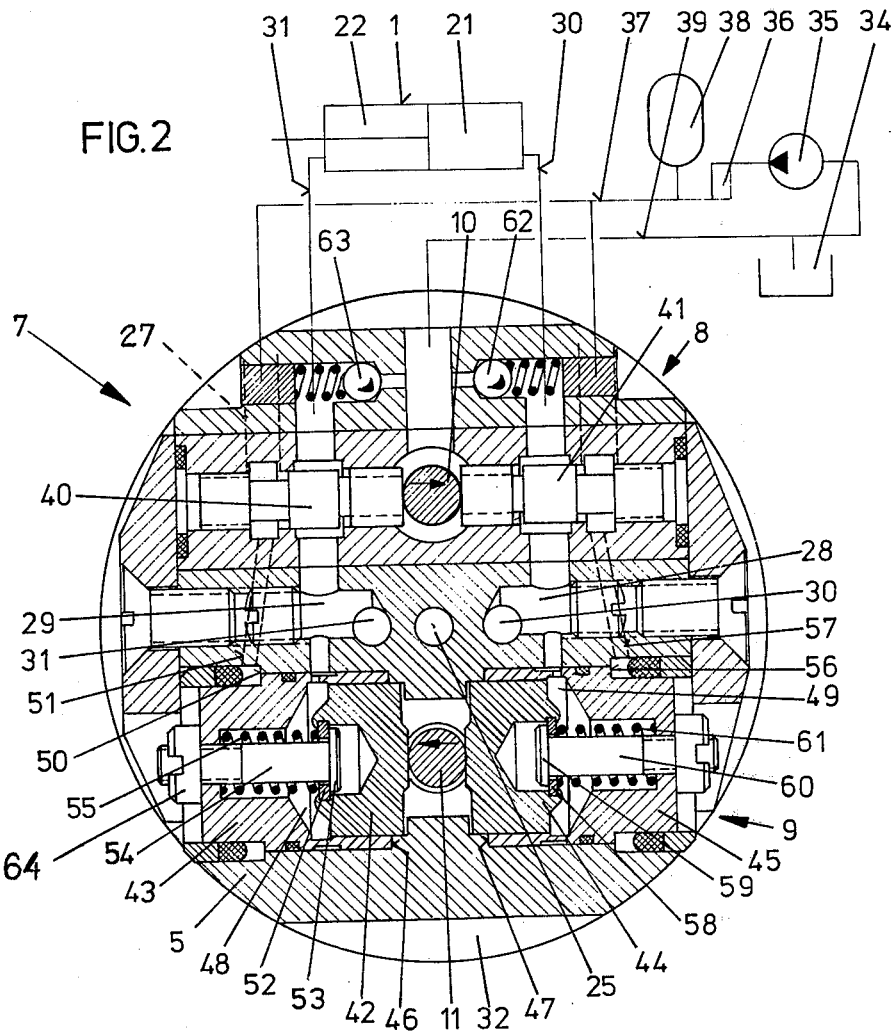
FIG. 2 is an enlarged transverse section view through a plane indicated by section line II—II in FIG. 1, turned by 90°, with a schematic representation of a fluid pressure control system.

FIG. 2 schematically shows the pressure medium circulating system. A servo pump 35 induces flow of the pressure medium from a reservoir tank 34 through a storage loading valve 36 and a pressure line 37, to the inlet 23 of the steering gear housing 1, wherein the pressure medium flows in a known manner through the pipe 24 and the bore 25 of the threaded spindle 5 to the control valve 8 and returns through outlet 33 and a low pressure return line 39 to the tank 34. A fluid pressure storing accumulator 38 is connected to the pressure line 37. The control valve 8 includes valve pistons 40 and 41 disposed on opposite sides of the pin 10, and in the neutral position of the control valve 8, the pistons block the flow of pressure medium from the accumulator 38 while maintaining fluid communication between the pressure chambers 21 and 22 and the return line 39.

The two parts of the reaction force limiting device 9, arranged coaxially in relation to one another, and operated by the pin 11, consist of a reaction force transmitting piston 42 slidably mounted in a force limiting piston 43 for one of the pressure chambers 22, and a reaction force transmitting piston 44 slidably mounted in a force limiting piston 45 for the other pressure chamber 21. The two reaction pistons 42 and 44 are shiftably only outwardly since stops 46 and 47 in combination with the limiting pistons 43 and 45 prevent any inward movement from the neutral position. Between the reaction piston 42 and the limiting piston 43 lies a chamber 48, which is in fluid communication with the pressure chamber 22 by way of the channel 29 and passage 31. Between the reaction piston 44 and the limiting piston 45 lies a chamber 49, which is in fluid communication with the pressure chamber 21 by way of the channel 28 and passage 30. The pressure piston 43 has an axial pressure face 50, which is acted upon by the storage pressure in line 37 applied through passage 51. The reaction piston 42, which is disposed slideably in the limiting piston 43, is supported by a disk 52 biased against a head 53 of an expansion bolt 54 by a spring 55 reacting against the limiting piston 43. Likewise, the limiting piston 45 has a pressure face 56, which is acted upon by the storage pressure in passage 57. The reaction piston 44, disposed slideably in the limiting piston 45, is supported by a disk 58 biased against the head 59 of an expansion bolt 60 by a spring 61 reacting against the limiting piston 45.

The size of the pressure faces 50 and 56, acted upon by the storage pressure, is designed such, that the limiting piston 43 or 45 produces a counter-force which is about 30 to 50% of the maximum reaction force produced and acting through the reaction piston 42 or 44 on the pin 11. It is the purpose of this arrangement to prevent any increase in the reaction force beyond the value necessary during normal travel of the vehicle. The expansion bolt 54 or 60 has a threaded portion projecting from the limiting piston 43 or 45 into the force transmitting piston 42 or 44 to mount an adjusting nut 64 so that the reaction piston 42 or 44 can be adjusted to engage the pin 11 in the neutral position without clearance. By changing the size of the pressure face 50 or 56 in relation to the cross sectional surface of the reaction piston 42 or 44, the limits imposed on the reaction force can be changed so as to adapt the device to various types of vehicles.

In order to ensure the dirigibility of the vehicle in case of a failure of the servo pump 35, a check valve 62 or 63 is disposed between the line 30 or 31 and the return line 39.

If, for example, the steering is effected in one direction so that the pins 10 and 11 are shifted clockwise, as shown by the arrows in FIG. 2, then the valve pistons 40 and 41 of the control valve 8 shift to the right and the reaction piston 44 of the limiting valve 9 to the left, while the limiting pistons 43 and 45 remain in abutment with the stops 46 and 47, because of the storage pressure acting on the pressure faces 50 and 56. As a result of the foregoing displacement of the control valve 8, the pressure medium flows from accumulator 38 via the line 37 past piston 40 into the pressure chamber 22, whereby the hydraulic piston 2 is shifted correspondingly to displace the pressure medium from the pressure chamber 21 past piston 41 to the return line 39 into the tank 34. In this case, the reaction piston 42 is pushed by the pin 11 to the left somewhat into the limiting piston 43 against the resistance of the pressure in the pressure chamber 22, acting in the chamber 48, which must be overcome as a reaction force. Since the storage pressure in line 37 is considerably greater than the operating pressure prevailing in the chamber 48, the reaction force acting on the reaction piston 42 continues to correspondingly rise until the fluid pressure forces acting oppositely on the limiting piston 43, are equal. The fluid pressure force on one side of piston 43 (P1) is the product of the storage pressure and the area of face 50 while the force on the other side of piston 43 (P2) is the product of the operating pressure in chamber 48 and the end face of the limiting piston 43. When the operating pressure increases relative to the storage pressure to a certain value, the limiting piston 43 is shifted to the left and the disk 52, in the reaction piston 42, which previously had been lifted off the head 53 of the expansion bolt 54, to compress the spring 55, again comes into contact with the head 53. The degree to which the operating pressure rises governs the force exerted outwardly by the limiting piston 43 on the reaction piston 42 through the expansion bolt 54 to limit the resultant reaction force resisting displacement of the pin 11. Therefore, the reaction force produced does not exceed an upper limit value deemed sufficient for steering of the vehicle during normal travel. The same is true with respect to action of the limiting piston 45 when steering in the opposite direction from that heretofore described. Thus, steering of the vehicle during parking maneuvers, is facilitated.

I claim:

1. In combination with a fluid power steering device having a source (38) of fluid medium under a storage pressure, a fluid motor (1) having a pressure chamber (21 or 22) and control valve means (8) displaceable from a neutral position for supply of the fluid medium to the pressure chamber under an operating pressure, said control valve means including means operative in said neutral position for blocking flow of the fluid medium from the source, and operating pressure responsive means for producing reaction force to resist said displacement of the control valve means from the neutral position including a force limiting piston (43 or 45) having opposed pressure faces (50 or 56) respectively exposed to said storage and operating pressures to limit the reaction force and force transmitting means (42 or 44) connected to the forces limiting piston and operatively engageable with the control valve means for exerting said reaction force thereon.

2. The combination of claim 1 wherein the power steering device includes actuating means (10 or 11) engageable with the control valve means and the reaction force producing means, said force transmitting means including a reaction piston (42 or 44) engaged by the actuating means and coacting with the force limiting piston to form an operating chamber (48 or 49) therebetween in fluid communication with the pressure chamber.

3. The combination of claim 2 wherein said opposed pressure faces are dimensioned to produce equal opposing forces acting on the force limiting piston at a predetermined value of the operating pressure.

4. The combination of claim 3 wherein said predetermined value of the operating pressure is approximately 30 to 50% of the storage pressure.

5. The combination of claim 4 wherein the opposing forces acting on the force limiting piston depend on the surface area ratio of said opposed pressure faces and the ratio of said storage and operating pressures.

6. The combination of claim 5 including stop means (64) engageable by the force limiting piston for limiting movement thereof to a terminal position, and adjustable means (53–54 or 59–60) connecting the reaction piston to the force limiting piston for positioning the reaction piston in contact with the actuating means in the terminal position of the limiting piston.

7. The combination of claim 6 wherein said adjustable means includes spring means (55 or 61) carried by the force limiting piston and acting through the reaction piston for biasing the actuating means and the control valve means to said neutral position.

8. The combination of claim 2 including stop means engageable by the force limiting piston for limiting movement thereof to a terminal position, and adjustable means connecting the reaction piston to the force limiting piston for positioning the reaction piston in contact with the actuating means in the terminal position of the limiting piston.

9. The combination of claim 8 wherein said adjustable means includes spring means (55 or 61) carried by the force limiting piston and acting through the reaction piston for biasing the actuating means and the control valve means to said neutral position.

10. The combination of claim 1 wherein said opposed pressure faces are dimensioned to produce equal opposing forces acting on the force limiting piston at a predetermined value of the operating pressure.

11. The combination of claim 10 wherein said predetermined value of the operating pressure is approximately 30 to 50% of the storage pressure.

12. The combination of claim 10 wherein the opposing forces acting on the force limiting piston depend on the ratio of said opposed pressure faces and the ratio of said storage and operating pressures.

13. In combination with a fluid power steering device having a source of fluid medium under a storage pressure, and a fluid motor (1) having a pressure chamber, control valve means connected to said source and displaceable from a neutral position for supplying the fluid medium at a varying operating pressure to the pressure chamber and a valve actuator, means (9) for yieldably resisting actuation of the control valve means by the valve actuator, comprising reaction pressure means (42 or 44) engageable with the actuator for opposing said displacement of the control valve means from said neutral position with a reaction force that is a function of the operating pressure, and fluid pressure control means (43 or 45) connected to the reaction pressure means for limiting the reaction force developed as a function of the ratio of the storage and operating pressures, said control valve means including means operative in the neutral position for blocking flow of the fluid medium from the source.

14. The combination of claim 13 wherein said fluid pressure controlled means includes a piston having opposed pressure faces respectively exposed to the storage and operating pressures, said pressure faces being dimensioned to equalize the opposing forces acting on the piston at a predetermined value of the operating pressure to prevent any further increase in the reaction force developed.

15. The combination of claim 14 wherein said predetermined value of the operating pressure is approximately 30 to 50% of the storage pressure.

* * * * *